United States Patent [19]

Wiatrowski

[11] Patent Number: 5,490,288
[45] Date of Patent: Feb. 6, 1996

[54] METHOD FOR DETERMINING LOW SIGNAL QUALITY COMMUNICATIONS

[75] Inventor: David G. Wiatrowski, Gurnee, Ill.

[73] Assignee: Motorola, Inc., Schaumburg, Ill.

[21] Appl. No.: 196,614

[22] Filed: Feb. 8, 1994

[51] Int. Cl.$^6$ .............................. H04B 1/00; H04M 11/00
[52] U.S. Cl. ...................... 455/54.1; 455/33.1; 455/54.2; 455/67.1; 379/59; 379/60
[58] Field of Search .................................. 455/33.1, 54.1, 455/54.2, 67.1, 69, 67.3, 67.7, 70, 56.1, 8, 9, 115, 226.1, 226.2, 226.3; 379/59, 60, 10, 11

[56] References Cited

U.S. PATENT DOCUMENTS

| | | | |
|---|---|---|---|
| 5,095,500 | 3/1992 | Tayloe et al. | 379/32 |
| 5,212,823 | 5/1993 | Fujii et al. | 455/54.1 |
| 5,257,399 | 10/1993 | Kallin et al. | 455/33.1 |
| 5,257,405 | 10/1993 | Reitberger | 455/54.1 |
| 5,293,639 | 3/1994 | Wilson et al. | 455/17 |
| 5,329,574 | 7/1994 | Nielson et al. | 379/58 |
| 5,345,598 | 9/1994 | Dent | 455/54.1 |

*Primary Examiner*—Reinhard J. Eisenzopf
*Assistant Examiner*—Lee Nguyen
*Attorney, Agent, or Firm*—Timothy W. Markison

[57] ABSTRACT

In a communication system 100, failures can be determined without field testing in the following manner. For each transmission, a communication unit 104 determines the signal quality of the transmission. When the signal quality of the transmission is unfavorable, the communication unit 104 determines its location within the communication system 100 and the time the transmission was transmitted. Having stored this information, the communication unit 104 transmits it to a communication resource allocator 101. Upon receiving this information, the communication resource allocator 101 determines a cause for the unfavorable signal quality.

15 Claims, 2 Drawing Sheets

METHOD FOR DETERMINING LOW SIGNAL QUALITY COMMUNICATIONS

TECHNICAL DESCRIPTION OF THE INVENTION

The present invention relates generally to communication systems and, in particular to, a method of detecting low signal quality communications with a communication system.

BACKGROUND OF THE INVENTION

Radio Frequency (RF) communication systems are known to include a plurality of communication units that communicate with each other over communication resources. Access to these communication resources is controlled by a communication resource controller and granted upon request. To request access to a communication resource, a communication unit transmits a resource request via a control channel (a communication resource dedicated for transceiving system operational information between the communication units and the communication resource controller). Upon receiving the request, the communication resource controller determines if a communication resource is available for allocation to the requesting communication. If a resource is available, it is allocated to the requesting communication unit such that unit may communicate with another communication unit. If, however, a resource is not presently available, the request is placed in a queue waiting for a resource to become available.

As is also known, most communication units in RF communication systems are mobile radio/telephones or portable radio/telephones. Because of this, a communication unit may be located anywhere within the coverage area of the communication system. It is also known that as a communication unit moves about within the coverage area, the signal quality of the communication unit's transmissions varies. This variation is due to many factors such as: Raleigh fading, geographic obstacles (buildings, mountains, etc.), operating at the fringes of the coverage area, or failures of the communication unit or the communication system infrastructure (repeaters that transceive the communication resources, the communication resource controller, and the links that tie the communication system together). Unfortunately, many of these signal quality variants are inherent characteristics of an RF communication system, but can be compensated for in the design of a communication system.

Despite the noblest of design efforts, some of these signal quality variants cannot be detected until the communication system has been built and is in operation. Thus, when one of these signal quality variants is too excessive, i.e., produces an unacceptable signal quality level (typically a signal-to-noise ratio of 17dB is needed for minimal signal quality levels), field testing must be done to determine the cause of the problem. The problem may be any one of the above mentioned leading to a variety of solutions. For example, if the problem is determined to be equipment failure, the equipment is simply replaced. If the problem is geographic obstacles, another repeater may be needed in this area. As another example, repeater orientation may need to be adjusted if multiple repeaters are interfering with one another.

While all of the solutions will resolve the problems, data identifying these problems must be collected from field service operations, which may takes weeks to acquire. Therefore, a need exists for a method that allows signal quality data to be acquired without the need for field service testing and data gathering.

DESCRIPTION OF A PREFERRED EMBODIMENT

Generally, the present invention provides a method for identifying low signal quality communications. This is accomplished by having communication units monitor the signal quality levels of their radio transmissions. The communication unit determines which transmissions have an unfavorable signal quality level. For these transmissions, the communication unit stores the time when these transmission were transmitted, the signal quality of the transmission, and the location of the communication unit when the transmission was transmitted. This information is then conveyed to a communication resource allocator, which collects and stores this type of information from all the communications units in the system. Having this information, the communication resource allocator can determine causes to system problems and identify possible solutions all without the need for field testing and data gathering.

Figure 1:
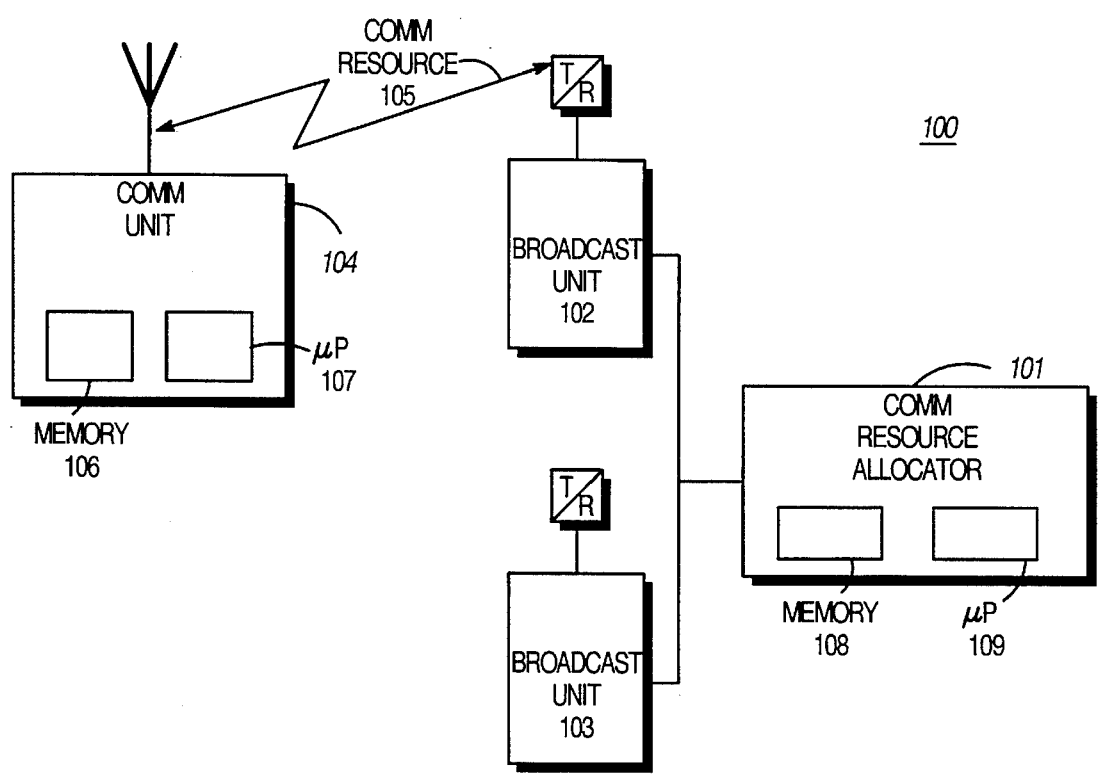
FIG. 1 illustrates a communication system that includes an implementation of the present invention.

The present invention can be more fully described with reference to FIGS. 1 and 2. FIG. 1 illustrates a communication system 100 that includes a communication resource allocator 101, a plurality of broadcast units 102–103, a plurality of communication units 104 (one shown) and a limited number of communication resources 105. The communication unit 104, which may be a Motorola Digital Saber Radio, comprises memory 106 and a microprocessor unit 107. The communication allocator 101, which may be a Motorola Trunked Network Manager, comprises memory 108 and a microprocessor unit, 109. The memory elements 106, 108 may be RAM, ROM or any type of digital information storage device, where the microprocessing devices 107, 109 may be a microprocessor such as a Motorola MC68HC11F1 or a microcomputer.

Figure 2:
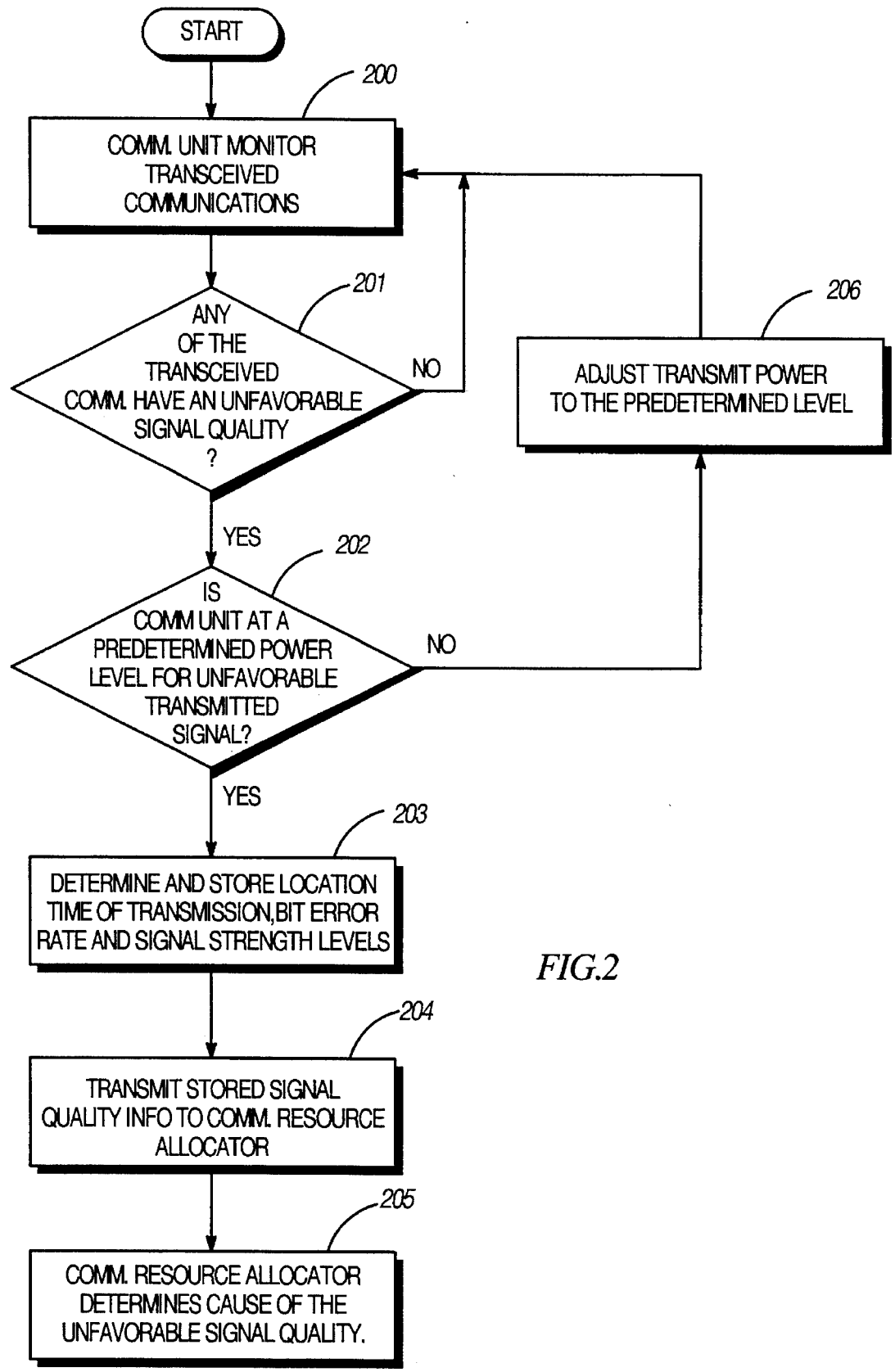
FIG. 2 illustrates a flow chart of an implementation of the present invention.

FIG. 2 illustrates a flow chart of an implement the present invention. At step 200, a communication unit monitors all of its transceived communications. These transceived communications may be either a transmission initiated by the communication unit or one that is received by the communications unit. In the case of communications received by the communications unit, the communications unit is capable of determining signal quality of received signals by estimating the bit error rate and signal strength of the received communications. The bit error rate is computed by decoding the error correction parity bits which are added to the digital data being transmitted. In the case of communications transmitted by the communications unit, the broadcast unit, which received the transmission via a communication resource, will perform a similar signal quality level measurement on the transmissions. This estimated signal quality level information is then transmitted to the communication unit at the end of its transmission.

Having this signal quality information, the communication unit determines if the signal quality level of any transceived communications is unfavorable 201. The communication unit may make this determination by calculating the bit error rate and the signal strength. If either the bit error rate or the signal strength is unfavorable, the communication unit identifies the signal quality level of the received signal as unfavorable. Unfavorability of the signal strength is determined via experimental data. For example, in a Motorola ASTRO™ systems, an unfavorable bit error rate is 1.5% or above, while an unfavorable signal strength level is 3 dB below the 1.0% BER static sensitivity of the communications unit. If the signal quality level is favorable 201, then the communications unit continues monitoring transceived communications in step 200.

If, however, the signal quality level is unfavorable 201, the communication unit determines whether it is operating at a predetermined power level 202. If the communication unit is not at the predetermined power level 202, the communication unit adjusts its transmitting power level to the predetermined power level 206 and repeats the process at step 200. To make this adjustment, the communications unit may employ an algorithm that modifies its transmit power level to a maximum level. The algorithm may also adjust the transmit power level to any level to maximize battery life and performance.

When the signal quality is unfavorable and the communication unit is at the predetermined power level 202, the communication unit determines its location when the unfavorable transceived communication was transmitted and the time it was transmitted 203. The location and time, which includes the date, are determined by a Global Positioning System (GPS) receiver located in the communication unit. (Note that the GPS receiver is not shown in FIG. 1.) Alternatively, the location and time may be ascertained by a LOng RANge (LORAN) receiver, which would be located in the communication unit. Regardless of how the location and time is derived, this information is stored in the memory of the communications unit.

After the location, time, and signal quality information is stored, the communication unit transmits it to the communication resource controller 204. The communication unit may transmit this information to the communication resource controller in a variety of ways. For example, the information may be sent in response to a request from the communication resource allocator or it could be automatically sent after the communication unit has stored it.

Once the communication resource allocator has obtained the information regarding unfavorable transceived communications, it determines a potential cause of the poor signal quality 205. This determination may be done in an almost endless number of ways. For example, the communication resource allocator may compile a substantial amount of signal quality information from a plurality of communication units to determine the cause or a cause may be determined for each unfavorable transceived communication. Note that the communication resource controller's reliability in determining a cause is enhanced as the amount of data collected is increased.

As a further explanation of the present invention, consider the several types of failures that may occur within a communication system. A first type of failure involves a failed broadcast unit. The communication resource controller would determine this type of failure by compiling data which indicates that a large quantity of communications units are experiencing unfavorable signal quality levels in a large geographical region. Another type of failure involves a single failed communication unit which would be determined by the communication resource allocator as a result of receiving unfavorable signal quality levels from a single communication unit throughout the communication system.

Yet another type of failure involves an isolated geographical region within the system which generally provides poor communications (i.e., at the fringe of the coverage area of a broadcast unit, or a cancellation area between two or more broadcast units.). This type of failure would be seen by the communications resource allocator as a large quantity of units reporting unfavorable signal quality levels in an isolated geographical region. And yet another type of failure involves some temporary co-channel interference from a nearby system. This would most likely be seen by the communications resource allocator as several communications units reporting unfavorable signal quality in random geographical locations throughout the system.

The present invention provides a method for identifying low signal quality communications within a communication system. With such a method, servicing a communication system is greatly enhanced. By having the information collated by the present invention, a service person may have direct information as to where the problem is and what is the cause of the problem. In prior art systems, a service person had to go into the field and collect this data him or her self which is extremely time consuming and expensive.

I claim:

1. In a communication system that includes a plurality of communication units, a limited number of communication resources that are transceived via broadcast units, and a communication resource allocator, a method for identifying low signal quality communications, the method comprises the steps of:

a) monitoring, by a communication unit of the plurality of communication units, signal quality of transceived communications to and from the communication unit;

b) determining, by the communication unit, whether any of the transceived communications have an unfavorable signal quality level to produce an unfavorable transceived communication;

c) when the unfavorable transceived communication is determined, determining, by the communication unit, location of the communication unit and transmitting time of day, including the date of the unfavorable transceived communication;

d) storing, by the communication unit, the location of the communication unit, the transmitting time of day, including the date, and signal quality level of the unfavorable transceived communication to produce stored signal quality information;

e) transmitting, by the communication unit, the stored signal quality information to the communication resource allocator; and f) determining, by the communication resource allocator, a cause for the unfavorable signal quality level of the transceived communication, such that the low signal quality communications are identified.

2. In the method of claim 1, step (a) further comprises, receiving, from a broadcast unit of the broadcast units, an indication of the signal quality of transmitted portions of the transceived communications.

3. In the method of claim 2, step (b) further comprises verifying that the determination of the signal quality level was done when the communication unit was transmitting at a predetermined power level.

4. In the method of claim 3, step (d) further comprises storing Bit Error Rate (BER) information and a signal strength level indication as at least part of the stored signal quality information.

5. In the method of claim 4, step (e) further comprises transmitting the stored signal quality information via a communication resource of the limited number of communication resources.

6. In the method of claim 1, step (b) further comprises verifying that the determination of the signal quality level was done when the communication unit was transmitting at a predetermined power level.

7. In the method of claim 1, step (d) further comprises storing Bit Error Rate (BER) information and a signal strength level indication as at least part of the stored signal quality information.

8. In the method of claim 1, step (e) further comprises transmitting the stored signal quality information via a communication resource of the limited number of communication resources.

9. In the method of claim 1, step (e) further comprises transmitting the stored signal quality information via a wireline link.

10. In a communication system that includes a plurality of communication units, a limited number of communication resources that are transceived via broadcast units, and a communication resource allocator, a method for identifying low signal quality communications, the method comprises the steps of:

a) receiving, by the communication resource allocator, signal quality information of transceived communications from a communication unit of the plurality of communication units, wherein the signal quality information includes location of the communication unit when a transceived communication having an unfavorable signal quality occurred and transmitting time of day, including the date, of the transceived communication;

b) storing, by the communication resource allocator, the signal quality information in a database; and c) determining, by the communication resource allocator, a cause for the unfavorable signal quality level of the transceived communication based on the signal quality information.

11. In the method of claim 10, step (a) further comprises receiving the signal quality information via a communication resource of the limited number of communication resources.

12. In the method of claim 10, step (a) further comprises receiving the signal quality information via a wireline link.

13. In the method of claim 10, step (a) further comprises receiving the signal quality information from a set of communication units of the plurality of communication units.

14. In the method of claim 10, step (c) further comprises collating the signal quality information from the set of communication units and the communication unit to produce collated data.

15. In the method of claim 10, step (c) further comprises determining, based on the collated data, the cause to be geographical locations with low signal quality levels.

* * * * *